L. HOWARD.
COFFEE POT.
APPLICATION FILED APR. 22, 1914.
1,139,288.
Patented May 11, 1915.
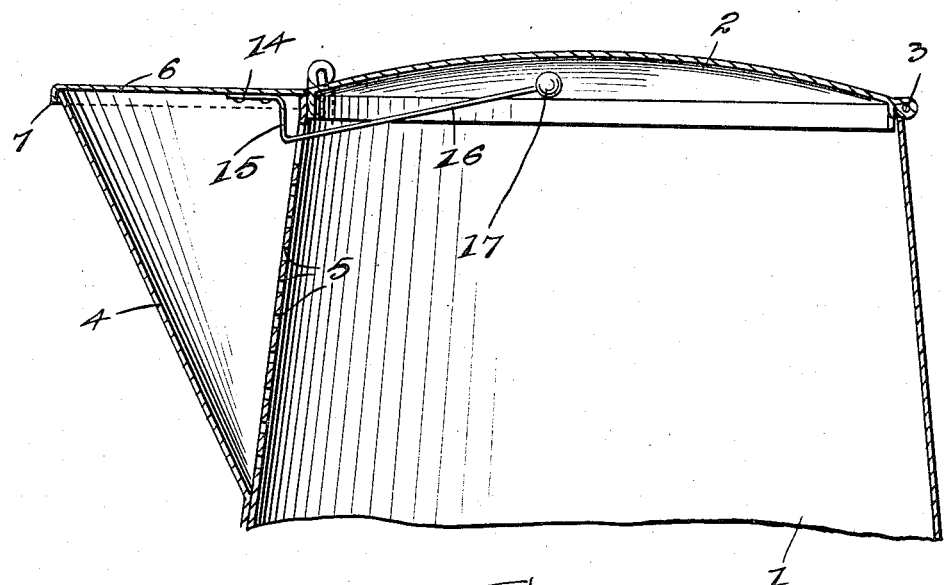
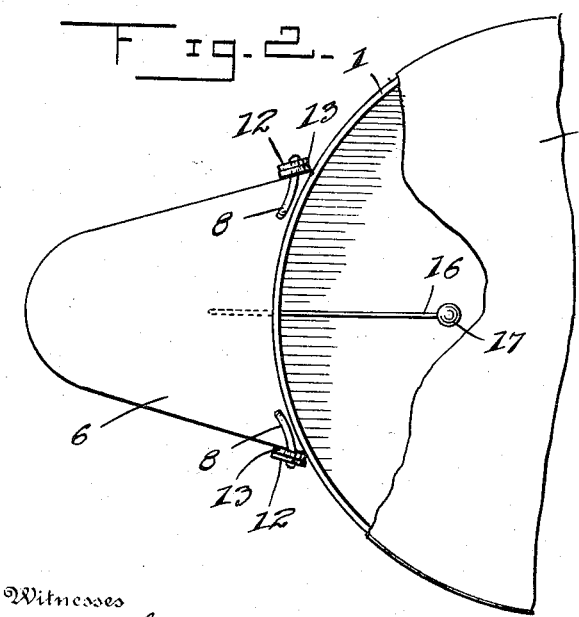
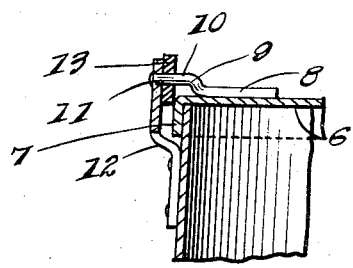
Inventor
L. Howard.

UNITED STATES PATENT OFFICE.

LYSANDER HOWARD, OF LOUISVILLE, KENTUCKY.

COFFEE-POT.

1,139,288. Specification of Letters Patent. Patented May 11, 1915.

Application filed April 22, 1914. Serial No. 833,736.

*To all whom it may concern:*

Be it known that I, LYSANDER HOWARD, a citizen of the United States, residing at Louisville, in the county of Jefferson and State of Kentucky, have invented certain new and useful Improvements in Coffee-Pots, of which the following is a specification.

This invention relates to new and useful improvements in coffee pots and has for its principal object to provide an automatic closer for coffee pot spouts.

Another object of the invention is to provide a device which will spring open and close according to the position in which the coffee pot is held.

A further object of the invention is to provide a novel combination and arrangement of parts by which the above mentioned objects may be attained.

With these and other objects in view the invention consists in the combination and arrangement of parts which will be fully set forth in the following specification and in the accompanying drawing, in which:

Figure 1 is a sectional view of a fragment of the coffee pot, showing this attachment as it would appear when applied thereto. Fig. 2 is a top plan view of Fig. 1, showing a portion of the coffee pot cover broken away to more clearly illustrate the operating mechanism. Fig. 3 is an enlarged detail sectional view of one of the hinge members, showing the construction thereof.

Referring now to the drawing by characters of reference the numeral 1 designates as an entirety a coffee pot of the ordinary construction having the usual lid 2 pivotally secured thereto, as at 3, the usual spout 4 being secured to the coffee pot, and the wall of the main body portion of the coffee pot is provided with a plurality of perforations 5 through which the coffee runs into the spout.

The cover for the spout is designated by the numeral 6 and is provided with a depending flange 7 which overlies the upper edge of the spout and prevents dust or other foreign substance from entering the spout. Secured near each edge of the cover 6 is a wire 8, which wires are bent upwardly toward their free ends, as at 9, and again bent outwardly to form the pivot point 10, which extends through the apertures 11 formed in the ears 12 which are rigidly secured in any suitable manner to the spout. A suitable spacing washer 13 surrounds the member 10 and holds the cover in proper position with relation to the spout.

Secured to the closure 6 is provided a wire 14, one end of which is bent downwardly, as at 15, and terminates in the angularly extending portion 16 having a suitable weight 17 at its free end.

It will be apparent from the foregoing that in use the coffee pot is used in the ordinary manner and when the same is tilted the weight 17 will cause the cover 6 to rise from its position on the spout and remain in its raised position until the coffee pot again assumes its normal position at which time the spout closure will engage the upper edge of the spout with the flange 7 overhanging the same and thus it will be seen that any dust or other foreign matter will be prevented from entering the coffee pot.

While in the foregoing there has been shown and described the preferred embodiment of this invention it is to be understood that such changes in the combination and arrangement of parts as may fall within the scope of the claim may be resorted to without departing from the spirit and scope of the invention.

Having thus described the invention what is claimed as new, is:—

The combination with a coffee pot having a spout, of a cover for the spout, brackets secured to opposite sides of said spout and extending upwardly to a point beyond the upper surface of said spout, a wire secured to each of the rear and outer ends of said cover, said wires being pivotally mounted in the brackets, a downturned flange on said cover to overhang the edges of said spout, a wire secured to the intermediate part of said cover and extending downwardly and inwardly within the coffee pot, and a weight on its free end to raise the cover when pot is tilted.

In testimony whereof I affix my signature in presence of two witnesses.

LYSANDER HOWARD.

Witnesses:
 ROSALIA BLAES,
 CARRIE BYERS.